March 7, 1933.  J. B. HENDERSON  1,900,709
GYROSCOPIC NAVIGATIONAL INSTRUMENT
Filed May 26, 1917
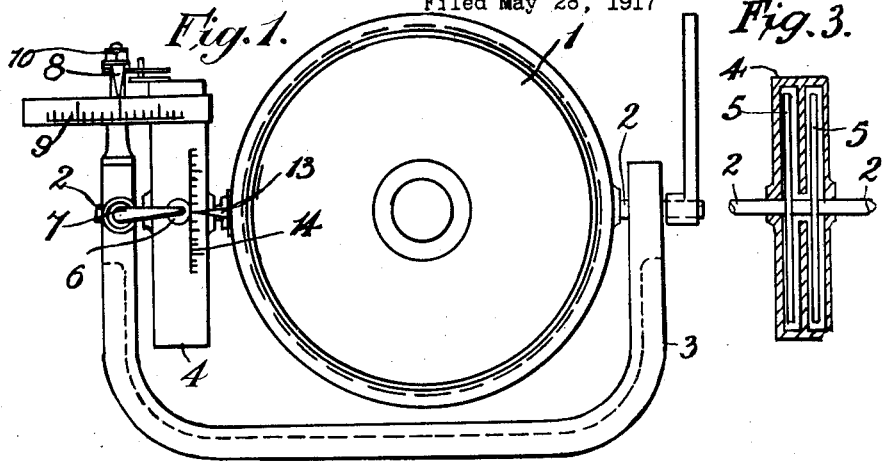
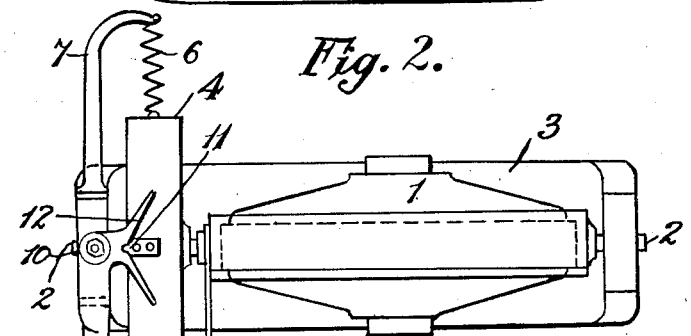
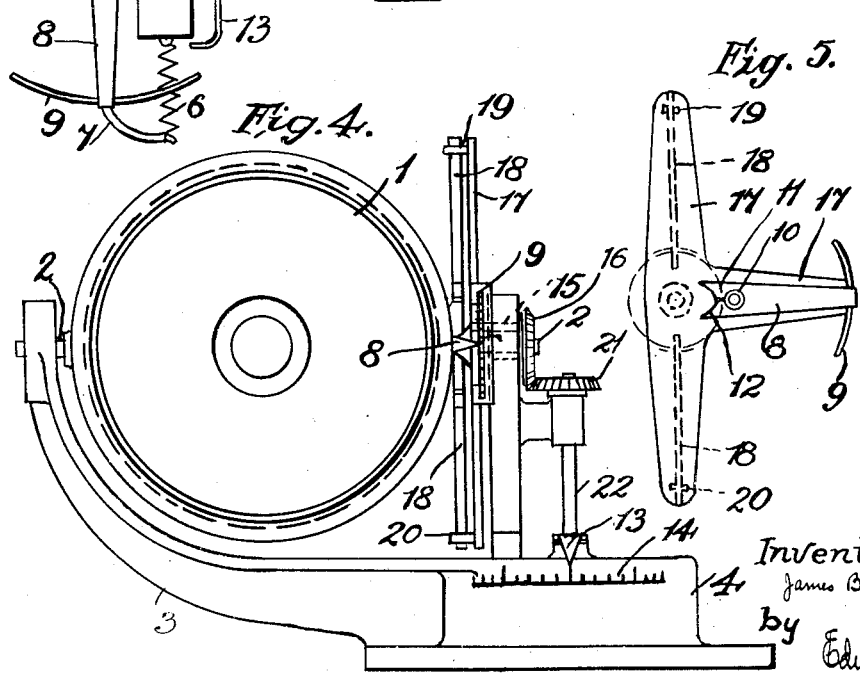
Inventor.
James Blacklock Henderson
by Edward Williams
Att'y.

Patented Mar. 7, 1933

1,900,709

UNITED STATES PATENT OFFICE

JAMES BLACKLOCK HENDERSON, OF LEE, ENGLAND

GYROSCOPIC NAVIGATIONAL INSTRUMENT

Application filed May 26, 1917, Serial No. 171,319, and in Great Britain May 11, 1916.

GRANTED UNDER THE PROVISIONS OF THE ACT OF MARCH 3, 1921, 41 STAT. L., 1313

The object of my invention is to provide an instrument for indicating the rate of angular motion and the angular displacement of any moving body relatively to a given direction. For example in navigation of ships, aeroplanes, airships and the like, the instrument may be used to indicate the rate of change of course, and the total change of course with reference to a given bearing since the instrument was last set. The instrument may also be applied to the automatic control of steering mechanism to enable a dirigible craft to be kept closely on a predetermined straight course, and it may of course be used to indicate either or both of the quantities above mentioned.

In the accompanying drawings:—

Figures 1 and 2 show respectively an elevation and plan of one arrangement of the instrument.

Figure 3 shows a section of the brake.

Figure 4 shows an elevation of another arrangement.

Figure 5 shows in detail the arrangement of spring control and the connection to the pointer in Fig. 4.

The instrument consists of a small gyroscope in the casing 1 (Figs. 1 and 2) which is mounted on the horizontal trunnion axis 2 in the frame 3. The frame is rigidly attached to the ship or aeroplane, the rotor axis being normally horizontal and preferably fore and aft. The trunnion axis carries the brake casing 4 which is viscously connected to it by means of the brake discs 5 (Fig. 3). These discs are keyed to the trunnion 2, a viscous fluid filling the space between the casing 4 and the discs 5. The brake casing 4 is constrained relatively to the frame 3 by two springs 6 which are respectively attached to the brake casing 4 and to the supports 7.

The motion of the casing 4 relatively to the frame 3 is indicated in a magnified degree by the pointer 8 which moves over the scale 9. The pointer 8 is pivoted on a fulcrum pin 10 on the frame 3, and an escapement pin 11, attached to the casing 4, engages with the escapement 12 which is attached to the pointer 8.

The motion of the rotor casing 1 relatively to the brake casing 4 is indicated by the pointer 13 and the scale 14, which is graduated on the brake casing 4.

If the gyro casing is in neutral equilibrium on its trunnion axis 2 and if the rotor axis be set horizontal with both pointers at the centres of their respective scales, when the ship is on a prescribed course, then if the gyro rotor be revolving the indication of the pointer 8 on the scale 9 will give a measure of the rate of change of course, whereas the pointer 13 will indicate on scale 14 the total deviation from the prescribed course.

An alternative arrangement of the parts is shown in Figs. 4 and 5, the corresponding parts being numbered as in Figs. 1 and 2. In this design the parts which are spring controlled have less inertia than those in Fig. 1 and the brake drum has a vertical axis so that it can be made oil retaining.

The trunnion 2 is carried in the sleeve bearing 15. To one end of the sleeve 15 is fixed the bevel pinion 16 and to the other end the treble arm 17 (shown detached in Fig. 5) which is linked to the gyro case 1 by the two cantilever springs 18 engaging in the slotted pins 19 and 20 which are attached to two of the arms 17. The scale 9 is carried by the third arm 17, and the pointer 8 is pivoted on the fulcrum pin 10 attached to 17 and the escapement pin 11 (Fig. 5) which is attached to the gyro trunnion by means of the disc 1a, as is shown dotted in Fig. 5, engages with the escapement 12 on the end of the pointer 8.

The pinion 16 meshes with the bevel pinion 21 on the vertical shaft 22, which carries the brake discs as in Fig 3. The brake casing 4 is in this design incorporated in the base of the instrument. The pointer 13 is attached to the shaft 22 and the scale 14 to the brake casing 4.

The pointer 8 indicates on the scale 9 the rate of change of course and the pointer 13 indicates on scale 14 the total change of course, since the instrument was last set.

This instrument makes a very serviceable relay for the control of steering. When a craft gets a deviation $\theta$ from its course the return to the course should be in the nature of a damped oscillation the equation of which is: $\theta'' + a\theta' + b\theta = 0$ in which $\theta''$ represents the acceleration or helm displacement, $a\theta'$ the rate of turning of the craft or rate of yaw, and $b\theta$ the angular displacement or yaw, $a$ and $b$ being constants. The couple applied by the helm to the craft must therefore be proportional to $a\theta' + b\theta$ and it is the skill in applying these two separate components, one proportional to the deviation and the other to the rate of turning, which makes the difference between a good steersman and a bad one. By employing the instrument described herein the need for constant attention by the pilot may be eliminated. A convenient arrangement for this purpose is to fix a crank 23 on the end of the trunnion 2 in the design shown in Fig 1. The motion of this crank relatively to the frame 3 is a combination of two components, one proportional to the rate of change of bearing and one proportional to the total change. The motion of the end of the crank 23 is transmitted to the tiller head through a servomotor of well known type so that the motion of the tiller becomes a combination of the two components mentioned above. Such a combination gives the best automatic control of the steering of a ship or aeroplane.

The instrument would be equally serviceable for indicating, recording or controlling any other angular motion about a fixed zero, such as the rolling or pitching of a ship or aeroplane and it is to be understood that its use is not confined to the indication of yaw or change of course.

What I claim as new and desire to secure by Letters Patent of the United States, is:—

1. In an instrument of the class described, a gyroscope having a rotary axis, a casing for said gyroscope, horizontal supporting trunnions for said casing, said rotary and trunnion axes being at right angles to each other, and means for indicating the rate of tilt of the gyroscope about the trunnion axis.

2. In an instrument of the class described, a gyroscope having a rotary axis, a casing for said gyroscope, supporting trunnions for said casing disposed on another axis at right angles to said rotary axis, and indicating mechanism associated with said trunnions comprising jointly cooperative members and constraining means responsive to said gyroscope and including a connection between certain members capable of slippage whereby said mechanism indicates the rate of tilt of said gyroscope and gives a speedometer reading.

3. In an instrument of the class described, a gyroscope having a rotary axis, a casing for said gyroscope, supporting trunnions for said casing disposed on another axis, said rotary and trunnion axes being at right angles to each other and normally lying in a horizontal plane, and co-acting elements associated with the trunnions for determining the rate of tilt of said gyroscope about the trunnion axis and giving a speedometer reading.

4. In an instrument of the class described, a gyroscope having a rotary axis, a casing for said gyroscope, supporting trunnions for said casing, a spring controlled means for partially constraining the tilt of said gyroscope about the trunnion axis including members one movable from the other with a loss of displacement relative to the other member, and means associated with said spring controlled means for determining the rate of tilt of said gyroscope about the trunnion axis.

5. In an instrument of the class described, a gyroscope having a rotary axis, a casing for said gyroscope, supporting trunnions for said casing, said rotary and trunnion axes being at right angles to each other and normally lying in a horizontal plane, spring controlled means for partially constraining the tilt of said gyroscope about the trunnion axis and means associated with said spring controlled means for measuring the rate of tilt of said gyroscope about the trunnion axis.

6. In an instrument of the class described, a gyroscope having a rotary axis, a casing for said gyroscope, supporting trunnions for said casing, means for partially constraining the tilt of said gyroscope about the trunnion axis, comprising a spring and a slow acting fluid device having a part thereof movable proportional to the rate of tilting of said gyroscope and a second part movable proportional to the total displacement of said gyroscope against said partial constraint.

7. In an instrument of the class described, a gyroscope having a rotary axis, a casing for said gyroscope, supporting trunnions for said casing, said rotary and trunnion axes being at right angles to each other and normally lying in a horizontal plane, means for partially constraining the tilt of said gyroscope about the trunnion axis, comprising a spring and a slow acting fluid device having a part thereof movable proportional to the rate of tilt of the gyroscope and a second part movable proportional to the total displacement of said gryroscope against said partial constraint, said parts having juxtaposed relatively oppositely movable members between surfaces of which viscous fluid is present.

8. In an instrument of the class described, a gyroscope having a rotary axis, a casing for said gyroscope, supporting trunnions for said casing, means for partially constraining the tilt of said gyroscope about the trunnion axis, comprising a spring and a slow acting fluid device having a part thereof movable proportional to the rate of tilting of said gyroscope and a second part movable proportional to the total displacement of said gyroscope against said partial constraint, and a member movable proportional to the combined rate and displacement.

9. In an instrument of the class described, a gyroscope having a rotary axis, a casing for said gyroscope, supporting trunnions for said casing, a frame mounting said trunnions said rotary and trunnion axes being at right angles to each other and normally lying in a horizontal plane, means for partially constraining the tilt of said gyroscope about the trunnion axis, comprising a spring and a slow acting fluid device having a part thereof movable proportional to the rate of tilt of the gyroscope and a second part movable proportional to the total displacement of said gyroscope against said partial constraint, and a member movable proportional to the combined rate and displacement, said spring being connected to said frame.

10. In an instrument of the class described, a gyroscope having a rotary axis, a casing for the gyroscope, trunnions for the casing at right angles to the rotary axis, a frame in which the trunnions are mounted and means connecting the casing to the frame including a part movable with the casing, a part free to move with respect to the casing, resilient means connecting the last mentioned part to the frame and a viscous substance between said parts, said parts and viscous substance being correlated to form a brake.

11. In an instrument for use on a moving craft, a gyroscope having a rotary axis, a casing for the gyroscope, trunnions for the casing, a frame in which the trunnions are mounted at right angles to the rotary axis, said trunnions and rotary axes normally lying in a horizontal plane and means connecting the casing to the frame including a part movable with the casing, a part free to move with respect to the casing, resilient means connecting the last mentioned part to the frame and a viscous substance between said parts, said parts forming a container having disc-like walls with the viscous substance therebetween forming a brake.

12. The combination with a dirigible craft, of an instrument for indicating changes in the course of the craft and comprising a gyroscope, means mounting the gyroscope on the craft so that said gyroscope is provided with freedom of movement about two axes at right angles to each other, one of said axes extending longitudinally of the craft, an indicating mechanism comprising a part yieldingly connected with the gyroscope to be movable thereby in accordance with the rate of angular displacement of the craft as the gyroscope precesses about the longitudinally extending axis and a part movable with the gyroscope and with respect to the first named part in accordance with and to indicate the amount of angular displacement of the craft.

13. In an instrument of the class described, a gyroscope, a support for the gyroscope mounting the latter for precession upon angular displacement of the support, and interconnected indicators, one having a part yielding connected with said gyroscope and another responsive to the movement of said part of the first named indicator, said first and second named indicators respectively showing the amount and rate of displacement of the support relative to the gyroscope.

14. In an instrument of the class described, a gyroscope, means whereby the gyroscope is provided with freedom of movement about two axes at right angles to each other, means for determining the rate of tilt of the gyroscope about one of the axes, and means included in the actuating means for said rate determining means for integrating and indicating the displacement of the gyroscope operable simultaneously with the rate determination.

15. In an instrument of the class described, an angularly displaceable support, a gyroscope mounted on said support to have freedom of movement about two axes at right angles to each other and to tilt about one of said axes, members movable by the tilting of said gyroscope upon angular movement of said support certain of said members being relatively displaceable proportionately to the total tilt of said gyroscope, a yielding connection between one of said members which is displaceable relatively to said support proportionately to the rate of tilt of the gyroscope, and another member responsively connected to said first named members and movable about the axis of tilt of said gyroscope in accordance with the sum of the rate and amount of tilt of the gyroscope.

16. In an instrument of the class described, a gyroscope, means whereby the gyroscope is provided with freedom of movement about two axes at right angles to each other, means for determining the rate of tilt of the gyroscope about one of the axes, means for integrating the displacement of the gyroscope combined with said means for determining the rate of tilt of the gyroscope and a part associated with the gyroscope having a displacement proportional to the sum of the rate of tilt and the integrated displacement of the gyroscope.

17. In combination, a dirigible craft, an instrument comprising a member rigidly attached to said craft, a gyroscope mounted on the member to turn about a normally horizontal axis, an indicating mechanism connected with the gyroscope and said member and having a part movable in accordance with the angular displacement of the craft, a second part and friction-developing means interposed between said parts, said second part being movable in accordance with the rate of displacement of the craft.

18. In combination, a dirigible craft, an instrument comprising a member rigidly attached to said craft, a gyroscope mounted on the member to turn about a normally horizontal axis when said craft alters its course and an indicator operatively responsive to the gyroscope and the member and having separate indicating devices for showing the rate and amount of turn of the craft.

19. In combination, a dirigible craft, an instrument comprising a member rigidly attached to said craft, a gyroscope, means directly mounting said gyroscope on said member to have freedom of movement about two normally horizontal axes at right angles to each other and to turn about one of said axes when the craft alters its course, indicating means having elements responsive to the turning of the gyroscope including a plurality of differently acting yielding means combined with said elements and value-indicating means cooperating with said elements to show the rate and amount of the turn of the craft.

20. In combination, a dirigible craft, an instrument comprising a support rigidly attached to said craft, a gyroscope directly mounted on the support to turn about a normally horizontal axis in accordance with the amount of change in the course of the craft, means responsive to said gyroscope and having interacting portions respectively adjustable proportionately to the amount of turning of the gyroscope about said axis and the rate of such turning, and a member combined with the gyroscope and said means and movable in accordance with the sum of the rate and amount of change of course of the craft.

21. A gyroscopic turn indicator comprising a gyroscope, means mounting the same for precession about a normally horizontal axis, said gyroscope being fixed about the vertical axis, yielding centralizing means connected to the gyroscope about said horizontal axis which opposes precession of the gyroscope about said axis with increasing force as said gyroscope becomes displaced from its normal position, and fluid containing means for damping the oscillation of said gyroscope about said axis, said fluid containing means serving as a drive between said gyroscope and yielding means.

22. A turn indicator comprising a gyroscope, means for mounting the same for precession about an axis at an angle to the vertical, said gyroscope being fixed about the vertical axis, and means comprising a spring under a slight initial stress when the gyroscope is in its normal position for offering very little force to small precessional movements of the gyroscope but for opposing further precession with greater force whereby the extent of precession of the gyroscope furnishes an indication of the rate of turn, and damping means for said gyroscope to which said spring is attached.

23. In a turn indicator for dirigible vehicles, a gyroscope mounted for precession about an axis at an angle to the vertical in response to turning of the vehicle in azimuth, a plurality of springs, a damping device to which said springs are attached, said device being also connected with said gyroscope, said springs being in end to end alignment with each other each of said springs opposing precession of said gyroscope about said axis in each direction.

24. In a turn indicator for aircraft, a frame, a support, pivots connecting said frame and support for permitting movement of said frame about an axis, at an angle to the vertical, a rotor mounted in said frame for rotation about another axis, and a spring extending radially of the axis about which said frame is mounted to turn, said spring being connected to said frame adjacent one of said pivots for opposing movement of said frame in either of opposite directions about said first named axis.

25. In a flying indicator adapted to be mounted on aircraft which banks on turning, a part adapted to be fixed on the aircraft, a gyroscope mounted on said part for precession on said craft at an angle to the vertical, means for opposing said precession and an index for indicating the apparent movements of the gyroscope with respect to said fixed part.

26. In a flying indicator adapted to be mounted on an aircraft which banks on turning, a part adapted to be fixed on the aircraft, a gyroscope mounted on said part for precession on said craft at an angle to the vertical, means for opposing said precession responsive to the rate of turn of said craft and an index for indicating the apparent movements of the gyroscope with respect to said fixed part.

27. In a flying indicator adapted to be mounted on an aircraft, a part adapted to be fixed to an aircraft, a movable index mounted thereon, an actuator for said index consisting of a device, means for mounting the same to move proportionately to angular velocity of the craft about a normally vertical axis, and means responsive to said angular velocity for opposing said actuator.

28. In a flying indicator adapted to be mounted on an aeroplane, a gyroscope, means for mounting the same on the aircraft for precession in response to angular movement of the aircraft, comprising a part adapted to be fixed to the aircraft in which the gyroscope is mounted for turning about an axis at an angle to the vertical, means responsive to the turning of the aircraft for opposing said precession, an an index controlled by said gyroscope and said means.

29. In a flying indicator adapted to be mounted on an aeroplane, a gyroscope, means for mounting the same on the aircraft for precession in response to movement of the aircraft about a substantially vertical axis comprising a part adapted to be fixed to the aircraft in which the gyroscope is mounted for turning about an axis at an angle to the vertical, means responsive to the angular velocity of the craft for opposing said precession, and an index controlled by said gyroscope and said means.

30. In a flying indicator adapted to be mounted on an aircraft, a part adapted to be fixed to an aircraft, a gyroscope mounted on said part for precession about an axis at an angle to the vertical, means variable in accordance with the angular velocity of the craft for opposing said precession and an indicator controlled by said gyroscope and said means.

31. In a position indicator adapted to be mounted on an aircraft, a movable index, a part adapted to be fixed to an aircraft, an actuator for said index consisting of a device mounted on said part tending to move proportionately to angular velocity of the craft, in a normally horizontal plane, and means variable proportionally to said angular velocity for limiting the movement of said index.

32. In an instrument of the class described, a gyroscope having a rotary axis, a casing for said gyroscope, horizontal supporting trunnions for said casing, said rotary and horizontal axes being at right angles to each other, and indicating mechanism comprising jointly cooperative members responsive to said gyroscope including different members acting respectively to indicate the amount and rate of tilt of said gyroscope.

33. In an instrument of the class described, a gyroscope having a rotary axis, a casing for said gyroscope supporting trunnions for said casing disposed on another axis, said rotary and trunnion axes being at right angles to each other and normally lying in a horizontal plane, and indicating mechanism associated with said trunnions comprising jointly cooperative members and constraining means responsive to said gyroscope and including a connection between certain members capable of slippage whereby said mechanism indicates the rate of tilt of said gyroscope and gives a speedometer reading.

34. In an instrument of the class described, a gyroscope having a rotary axis, a casing for said gyrocope, supporting trunnions for said casing, said rotary and trunnion axes being at right angles to each other and normally lying in a horizontal plane, spring controlled means for partially constraining the tilt of the gyroscope about the trunnion axis including members one of which is movable with one of said trunnions and another being movable from the first named member with a loss of displacement relative to said first named member, and means associated with said spring controlled means for measuring the rate of tilt of said gyroscope about the trunnion axis.

35. In a flying indicator adapted to be mounted on an aircraft which banks on turning, a part adapted to be fixed on the aircraft, a gyroscope mounted on said part for precession on said craft at an angle to the vertical, means for opposing said precession including a device and constraining means therefor, said device comprising members each independently mounted for movement and a medium co-acting with said members to tend to effect movement of one member from the other but permitting relative movement between the members, and means related to said gyroscope and one of said members for indicating the apparent movements of the gyroscope with respect to said fixed part.

36. In a turn indicator for dirigible vehicles, a gyroscope mounted for precession about an axis at an angle to the vertical in response to turning of the vehicle in azimuth, and a plurality of springs connected with said gyroscope in line with each other each of which opposes precession of said gyroscope about said axis in each direction.

37. A gyroscopic turn indicator comprising a gyroscope, means for mounting the same for precession about a normally horizontal axis, said gyroscope being fixed about the vertical axis, yielding centralizing means connected to the gyroscope about said horizontal axis which opposes precession of the gyroscope about said axis with increasing force as said gyroscope becomes displaced from its normal position and means for damping the oscillation of said gyroscope about said axis.

38. A turn indicator comprising a gyroscope, means for mounting the same for precession about an axis at an angle to the vertical, said gyroscope being fixed about the vertical axis, and means comprising a spring under a slight initial stress when the gyroscope is in its normal position for offering very little force to small precessional movements of the gyroscope but for opposing further precession with greater force whereby the extent of precession of the gyroscope furnishes an indication of the rate of turn.

39. In a turn indicator for aircraft, a frame, a support, pivots connecting said frame and said support for permitting movement of said frame about an axis, at an angle to the vertical, a rotor mounted in said frame for rotation about another axis, and a spring connected to said frame adjacent one of said pivots for opposing movement of said frame in either of opposite directions about said axis.

In witness whereof I have hereunto set my hand this 19th day of April 1917.

JAMES BLACKLOCK HENDERSON.